Nov. 2, 1965  L. K. DE SHETLER  3,215,390
TIE-DOWN DEVICE

Filed April 3, 1964  4 Sheets-Sheet 1

INVENTOR.
LOUIS K. DeSHETLER
BY
Whittemore, Hulbert & Belknap
ATTORNEYS

Nov. 2, 1965   L. K. DE SHETLER   3,215,390
TIE-DOWN DEVICE
Filed April 3, 1964   4 Sheets-Sheet 2
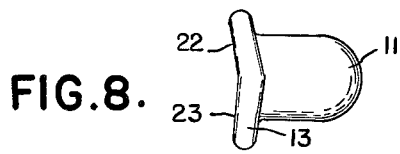
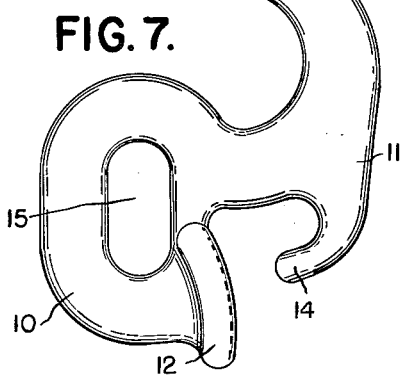
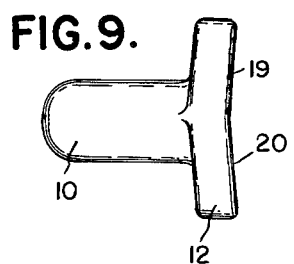
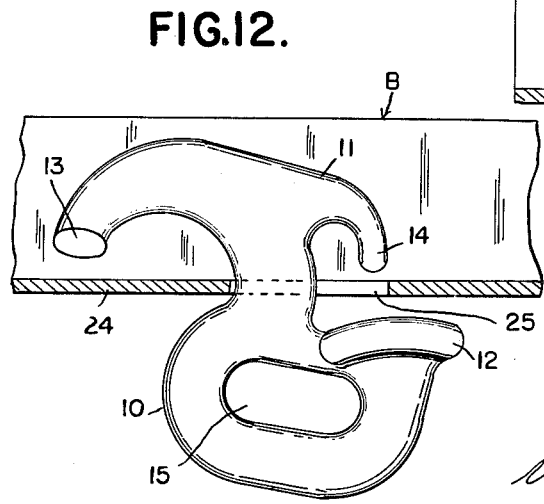
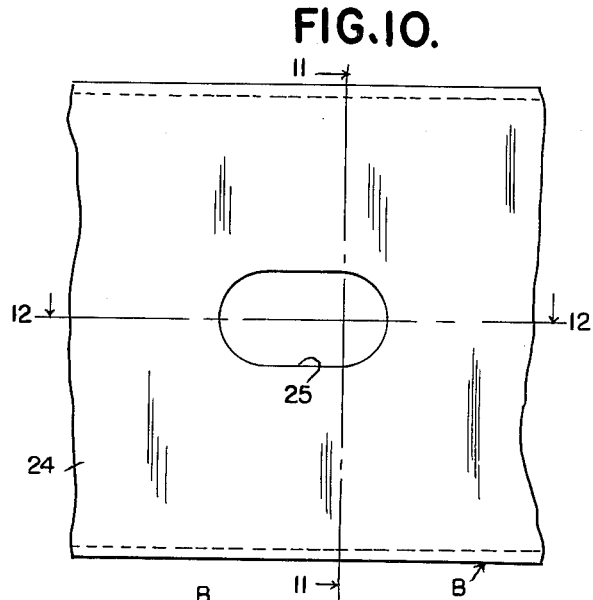
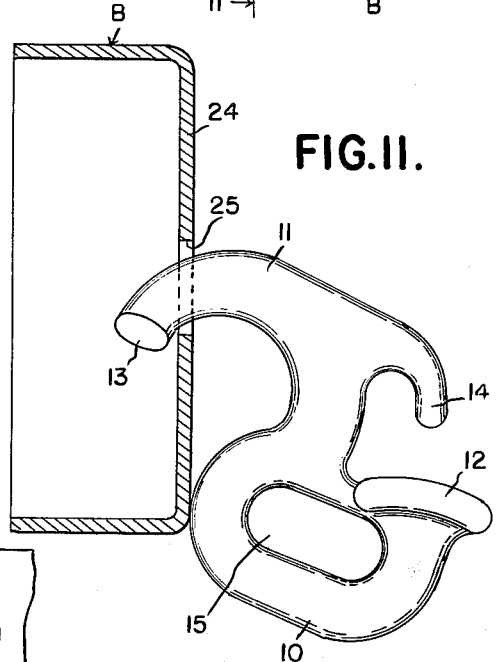
INVENTOR.
LOUIS K. DeSHETLER
BY
ATTORNEYS Nov. 2, 1965  L. K. DE SHETLER  3,215,390
TIE-DOWN DEVICE
Filed April 3, 1964  4 Sheets-Sheet 3

INVENTOR.
LOUIS K. De SHETLER
BY
*Whittemore, Hulbert & Belknap*
ATTORNEYS

Nov. 2, 1965     L. K. DE SHETLER     3,215,390
TIE-DOWN DEVICE

Filed April 3, 1964     4 Sheets-Sheet 4

INVENTOR.
LOUIS K. DeSHETLER
BY
*Whittemore, Hulbert & Belknap*
ATTORNEYS

United States Patent Office 3,215,390
Patented Nov. 2, 1965

3,215,390
TIE-DOWN DEVICE
Louis K. De Shetler, Allen Park, Mich., assignor to Whitehead & Kales Company, River Rouge, Mich., a corporation of Michigan
Filed Apr. 3, 1964, Ser. No. 357,166
8 Claims. (Cl. 248—361)

This invention relates generally to devices for tying down motor vehicles upon vehicle transports, such as railroad cars, trailers and the like, and refers more particularly to a tie-down device having an improved hook structure provided with one or more portions capable of being inserted through a suitable opening in and assembled in an improved manner with a metal anchorage member forming a part of or attached to the chassis frame of a motor vehicle to be tied down.

Sometimes, when an old form of hook structure is used, the motion of the vehicle transport tends to release the tension of the tie-down chain of the tie-down device, and when this occurs there is a tendency of the old form of hook structure to fall out of the opening therefor in the anchorage member.

Furthermore, because of vibration and motion of the vehicle transport, there is a tendency of an old form of hook structure to tear or deform the anchorage member at an edge of the opening and thereby make it easier for the old form of hook structure to fall out of the opening therefor in the anchorage member.

To prevent the hook structure from falling out of the opening therefor in the anchorage member, the body of my improved hook structure has a crossbar provided with one or more bearing surfaces which may contact the outer surface of the anchorage member, and the free end of a C-shaped portion of the hook structure has a crossbar provided with one or more bearing surfaces which may contact the inner surface of the anchorage member.

Also, the crossbar at the free end of the C-shaped portion of the hook structure is adapted, when assembled with said anchorage member, to be substantially parallel to the inner surface of the anchorage member, whereby such crossbar will effectively prevent accidental withdrawal of said hook structure from the opening in said anchorage member.

Thus, the provision of the crossbar at the free end of the C-shaped portion of the hook structure provides a safety feature to overcome the tendency of the hook structure to fall out of the opening in the anchorage member, especially when the tension of the tie-down chain is released.

Accordingly, one of the essential objects of the invention is to provide an improved hook structure having at the free end of the C-shaped portion thereof a crossbar that will be disposed in substantially parallel relation with the inner surface of the anchorage member when assembled therewith, and will effectively prevent the hook structure from becoming accidentally disengaged from said anchorage member.

Another object is to provide an improved hook structure having a crossbar as aforesaid provided throughout its length with a single straight bearing surface for contact with the inner surface of the anchorage member, or provided at opposite ends thereof with longitudinally aligned longitudinally extending inwardly inclined bearing surfaces for contact with the inner surface of the anchorage member.

Another object is to provide a hook structure wherein the body portion thereof is provided with a crossbar having throughout its length a single transversely curved surface for contact with the outer surface of the anchorage member, or having at opposite ends thereof longitudinally aligned longitudinally extending inwardly inclined bearing surfaces for contact with the outer surface of the anchorage member.

Another object is to provide an improved hook structure wherein both the C-shaped portion and a spur projecting edgewise from said C-shaped portion curve or extend toward the body of the hook structure, whereby a longitudinally extending portion of the crossbar at the free end of the C-shaped portion and the free end of the spur are adapted to engage the inner surface of the anchorage member in spaced relation to the edges of the opening therein.

Another object is to provide a hook structure that is simple in construction, economical to manufacture, and efficient in operation.

Other objects, advantages and novel details of construction of this invention will be made more apparent as this description proceeds, especially when considered in connection with the accompanying drawings, wherein:

FIGURE 7 is a view similar to FIGURE 1 but showing by dotted lines a difference in bearing surfaces of the crossbar on the body portion of the hook structure and a difference in the bearing surfaces of the crossbar at the free end of the C-shaped portion of the hook structure.

FIGURE 8 is a top plan view of the free end of the C-shaped portion and crossbar thereon of the hook structure, as shown in FIGURE 7.

FIGURE 9 is a bottom plan view of the body portion and crossbar thereon of the hook structure as shown in FIGURE 7.

FIGURE 10 is a fragmentary elevation of the anchorage member and showing an elongated slot therein.

FIGURE 11 is a vertical sectional view taken substantially on the line 11—11 of FIGURE 10, and showing the crossbar at the free end of the C-shaped portion of the hook structure inserted through the elongated opening in the web of the anchorage member.

FIGURE 12 is a sectional view taken substantially on the line 12—12 of FIGURE 10, and showing the position of the hook structure after said structure has been rotated 90° and after such structure has been rotated in the longitudinal plane thereof, and showing the C-shaped portion and spur of the hook structure after they have been inserted through the elongated opening in the web of the anchorage member.

Figure 2:
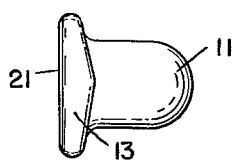
FIGURE 2 is a top plan view of the free end of the C-shaped portion and crossbar thereon of the hook structure.
Figure 1:
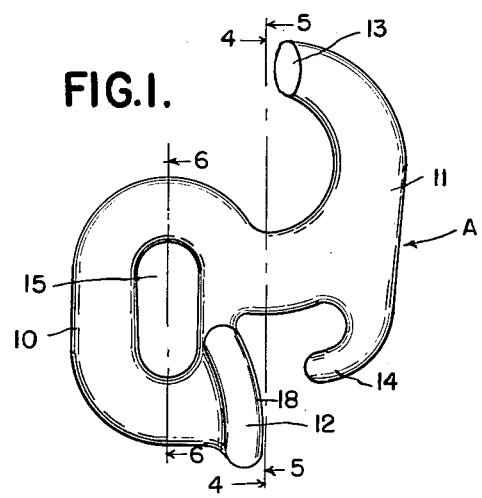
FIGURE 1 is an elevational view of a hook structure embodying my invention.
Figure 4:
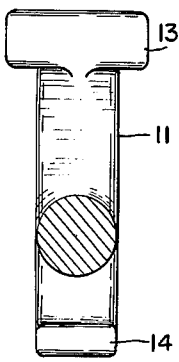
FIGURE 4 is a vertical sectional view taken substantially on the line 4—4 of FIGURE 1.
Figure 3:
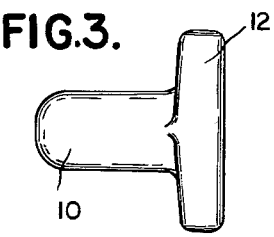
FIGURE 3 is a bottom plan view of the body portion and crossbar thereon of the hook structure.
Figure 5:
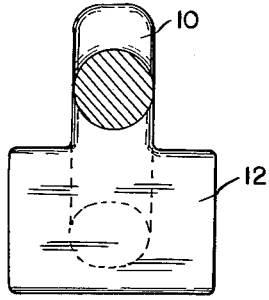
FIGURE 5 is a vertical sectional view taken substantially on the line 5—5 of FIGURE 1.
Figure 6:
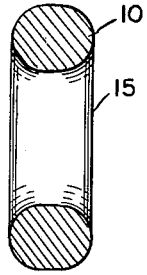
FIGURE 6 is a vertical sectional view taken substantially on the line 6—6 of FIGURE 1.
Figure 13:
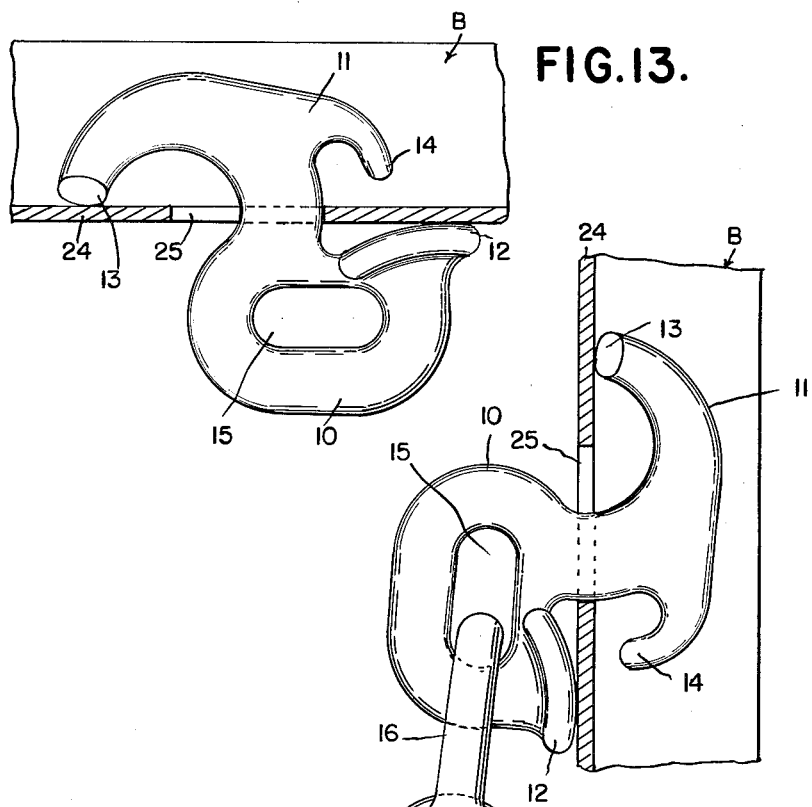

FIGURE 13 is a view similar to FIGURE 12, but showing the crossbar on the body portion of the hook structure and the crossbar on the free end of the C-shaped portion of the hook structure in engagement with opposite surfaces of the web of the anchorage member in one operating position.

Figure 14:
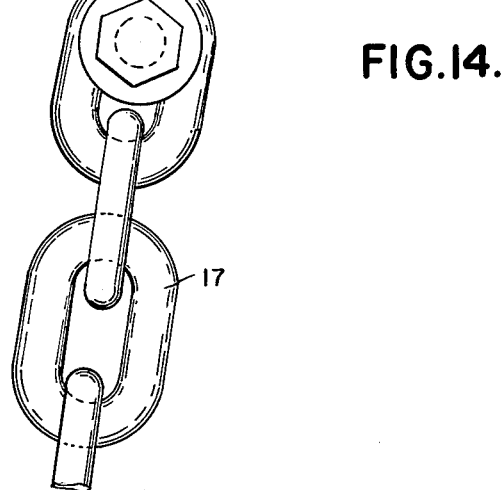

FIGURE 14 is a view similar to FIGURE 13, but showing a tensioning tie-down chain connected by a shackle to the body of the hook structure.

Figure 15:
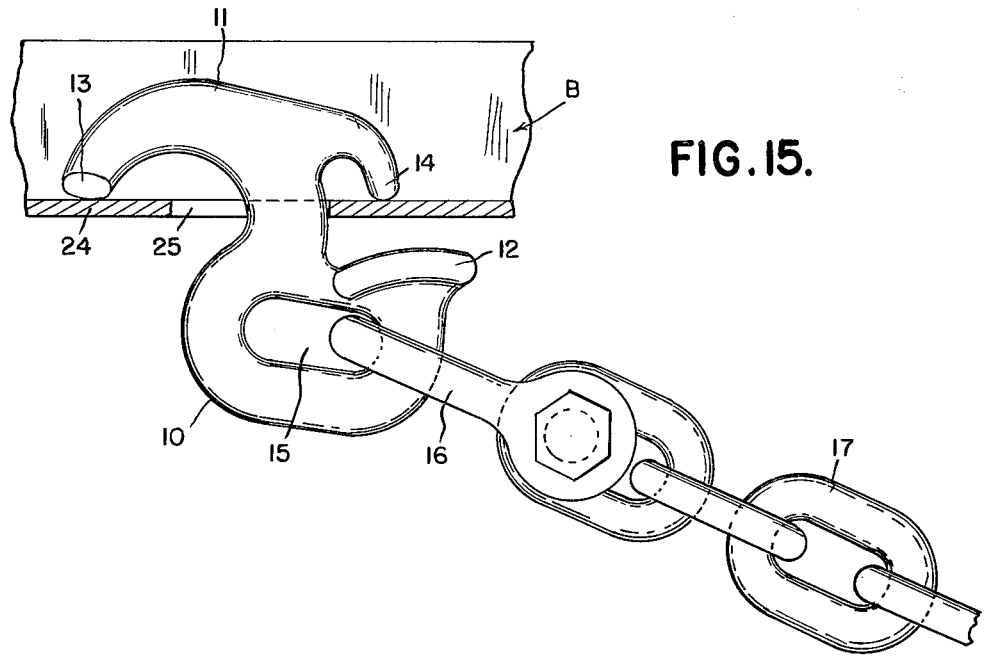

FIGURE 15 shows an alternate position of the hook structure wherein the spur and the crossbar at opposite ends of the C-shaped portion of the hook structure are in engagement with the inner surface of the anchorage member, while the crossbar on the body portion of the hook structure is in spaced relation to the outer surface of the anchorage member, and showing a tensioning tie-down chain connected by a shackle to the body of the hook structure.

Figure 16:
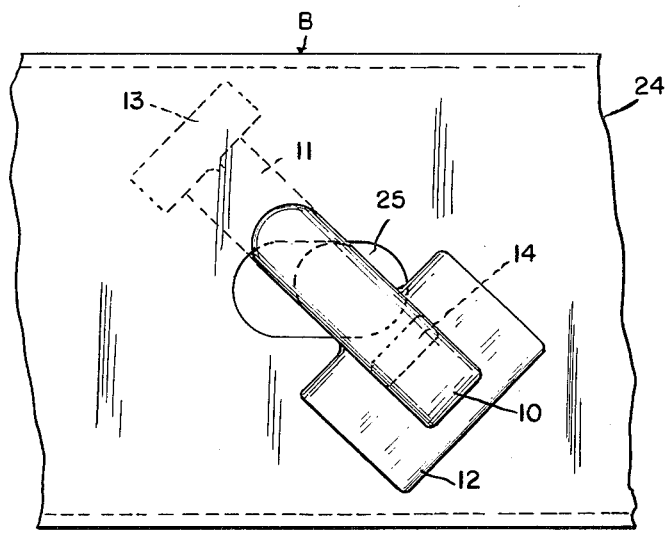

FIGURE 16 shows another alternate position of the hook structure wherein such hook structure is disposed at approximately a 45° angle to the elongated slot in the web of the anchorage member.

A is a one-piece metal hook structure embodying my invention having a substantially flat elongated body portion 10, a substantially flat C-shaped portion 11 projecting edgewise from the inner longitudinal edge of said body portion adjacent one end thereof, a bar 12 crossing the inner longitudinal edge of said body portion at the other end thereof, a bar 13 crossing the C-shaped portion 11 at the free end thereof, and a spur 14 projecting edgewise from said C-shaped portion at the rear thereof.

As shown, the body portion 10 is provided at the center thereof with a longitudinally extending elongated opening 15 that is adapted to receive either an end of a shackle 16 or a link (not shown) of a tensioning tie-down chain 17 attachable to a vehicle transport (not shown).

The C-shaped portion 11 projects upwardly from said body portion 10, while the spur 14 projects downwardly from said C-shaped portion, and both said C-shaped portion 11 and said spur 14 curve or extend toward the body portion 10 of the hook structure.

Preferably the bar 12 is disposed at substantially right angles to the body portion 10, and is transversely curved from its upper to its lower edges. The bar 12 is disposed in spaced relation to the spur 14, and the inner surface 18 of such bar may be either curved transversely from its upper to its lower edges, or may have at opposite ends thereof longitudinally aligned longitudinally extending inwardly inclined bearing surfaces 19 and 20 respectively of substantially equal area meeting each other substantially midway between opposite ends of said bar and disposed at substantially an obtuse angle to each other.

The bar 13 at the free end of the C-shaped portion 11 is preferably disposed at substantially right angles to the C-shaped portion 11, and may have throughout its length a single straight bearing surface 21, or may have at opposite ends thereof longitudinally aligned longitudinally extending inwardly inclined bearing surfaces 22 and 23 respectively of substantially equal area meeting each other substantially midway between opposite ends of said bar and disposed at substantially an obtuse angle to each other.

The hook structure A is adapted to be attached to a metal anchorage member B which may be a part of or attached to the chassis frame of a motor vehicle to be tied down. Such anchorage member B may be in either an upright, horizontal or inclined position, and may include a web 24 having an elongated opening 25 therein which may be in either a horizontal, vertical or inclined position. Also, the hook structure A can be in any angular relation to the elongated opening 25.

As shown, the anchorage member B extends horizontally, and the web 24 thereof extends vertically, while the elongated opening 25 in said web extends horizontally.

To assemble the hook structure A with the anchorage member B, the crossbar 13 at the free end of the C-shaped portion 11 of the hook structure is first inserted through the elongated opening 25 in the web 24 of the anchorage member B. Then the hook structure A is rotated approximately 90° so that the spur 14 of said hook structure will be able to enter the elongated opening 25 in the anchorage member. Then the hook structure A is rotated in the longitudinal plane thereof to permit the spur 14 to pass through the elongated opening 25 in the anchorage member B, as shown in FIGURE 12. Thereafter, the hook structure A may either be rotated approximately 45° to position portions of the crossbar 13 and spur 14 beyond opposite side edges of the elongated opening 25 in the anchorage member B, as shown in FIGURE 16, or may be slid lengthwise of the elongated opening 25 so that portions of both the crossbar 13 and spur 14 will be disposed beyond opposite ends of the elongated opening 25 in the anchorage member B, as shown in FIGURES 13, 14 and 15 respectively.

When the hook structure A is assembled as just described to the anchorage member B, the tensioning tie-down chain 17 is pulled down or tensioned by a winch or other suitable means (not shown) anchored to the vehicle transport, and is then held in such tensioned position by a lock on the winch.

Obviously, a cable or other suitable flexible element may be used instead of the chain 17, but in each instance the hook structure A would be at the free or attaching end of such flexible element. Also, any number of the tie-down devices comprising the hook structures A and the chains 17 or other flexible elements may be used to hold the vehicle on the vehicle transport. Usually there are four tie-down devices, one at each side of the vehicle near the front end thereof and one at each side of the vehicle near the rear end thereof, and in each instance the construction and operation would be substantially the same as that just described.

Ordinarily, the vehicle transport is a carry-car trailer or railroad car, however it is apparent that the vehicle transport could be a boat or any other means for transporting vehicles.

When the inner surface 18 of the bar 12 on the body portion 10 of the hook structure is curved transversely, and the inner surface 21 of the bar 13 at the free end of the C-shaped portion 11 of the hook structure is straight, such curved inner surface 18 of the bar 12 may bear against the outer surface of the web 24 of the anchorage member B, while the straight inner surface 21 of the bar 13 may bear against the inner surface of the web 24 of the anchorage member B when the tie-down chain 17 is tensioned. In this position, the spur 14 will be in spaced relation to the inner surface of the anchorage member B.

However, when the inner surface of the bar 12 on the body portion 10 of the hook structure is provided with two bearing surfaces 19 and 20 respectively, and the inner surface of the bar 13 at the free end of the C-shaped portion 11 of the hook structure is provided with two bearing surfaces 22 and 23 respectively, then the two bearing surfaces 19 and 20 of the bar 12 may bear against the outer surface of the web 24 of the anchorage member, while the two bearing surfaces 22 and 23 of the bar 13 may bear against the inner surface of the web 24 of the anchorage member B when the tie-down chain 17 is tensioned. In this position, the spur 14 will be in spaced relation to the inner surface of the anchorage member B.

Alternatively, the two bearing surfaces 22 and 23 of the bar 13 at the free end of the C-shaped portion 11 of the hook structure and the spur 14 may bear against the inner surface of the web 24 of the anchorage member B, while the two bearing surfaces 19 and 20 of the bar 12 on the body portion 10 of the hook structure may be in spaced relation to the anchorage member B, due to the angle of the tie-down chain 17 to said anchorage member, in another tie-down position.

As a further alternative, the two bearing surfaces 22 and 23 only of the bar 13 at the free end of the C-shaped portion 11 of the hook structure may bear against the inner surface of the anchorage member B, while the two bearing surfaces 19 and 20 of the bar 12 on the body portion 10 of the hook structure, as well as the spur 14 may be in spaced relation to the anchorage member B.

Moreover, should the spur 14 for any reason move accidentally through the elongated opening 25 in the anchorage member B to the outer side thereof when the tension of the tie-down chain 17 is released, then the bar 13 at the free end of the C-shaped portion 11 of the hook structure will engage the inner surface of the anchorage member B and will effectively prevent the hook structure from becoming accidentally disengaged from the anchorage member B.

Thus, in all assembled positions of the hook structure A relative to the anchorage member B, at least one bearing surface of the bar 13 at the free end of the C-shaped portion 11 of the hook structure will engage the inner surface of the anchorage member B and will provide a safety feature to prevent the hook structure A from becoming accidentally disengaged from the anchorage member B.

What I claim as my invention is:

1. A hook structure adapted to be secured to an anchorage member having a web provided with an opening, said hook structure having a body portion adapted to be positioned adjacent one surface of said web, said body portion having an opening for receiving a part of a tensioning element, having a crossbar adapted to be positioned beside and adapted to engage said one surface of said web, and having a C-shaped portion projecting edgewise therefrom and adapted to extend through the opening in said web, said C-shaped portion being provided at the free end thereof with a crossbar adapted to be disposed in substantially parallel relation with and adapted to engage the opposite surface of said web when the crossbar aforesaid is beside said web so as to prevent accidental withdrawal of said C-shaped portion from the opening in said web.

2. The hook structure defined in claim 1, wherein said C-shaped portion extends upwardly from and curves toward said body portion, and a spur projects downwardly from the lower edge of said C-shaped portion and curves toward said body portion, whereby both the free end of said spur and a longitudinally extending portion of the crossbar at the free end of said C-shaped portion may engage simultaneously the opposite surface of said web when the first mentioned crossbar is beside said web.

3. The hook structure defined in claim 1, wherein the crossbar at the free end of said C-shaped portion is provided throughout its length with a single straight bearing surface adapted to be in substantially parallel relation to the opposite surface of said web when the crossbar on said body portion is beside said web.

4. The hook structure defined in claim 1, wherein the crossbar at the free end of said C-shaped portion is provided at opposite ends thereof with longitudinally aligned longitudinally extending inwardly inclined bearing surfaces connected to each other at their inner ends at substantially an obtuse angle and providing at their outer ends inclined portions for contact with the opposite surface of said web when the crossbar on said body portion is beside said web.

5. The hook structure defined in claim 1, wherein the crossbar at the free end of said C-shaped portion is provided at opposite ends thereof with longitudinally aligned longitudinally extending inwardly inclined bearing surfaces of substantially equal area connected to each other at their inner ends substantially midway between opposite ends of said crossbar and disposed at substantially an obtuse angle to each other, whereby the outer ends respectively of said inclined bearing surfaces are engageable with the opposite surface of said web when the crossbar on said body portion is beside said web.

6. The hook structure defined in claim 1, wherein the crossbar on said body portion is provided throughout its length with a single longitudinally extending transversely curved surface for engagement with said one surface of said web.

7. The hook structure defined in claim 1, wherein the crossbar on said body portion has at opposite ends thereof longitudinally aligned longitudinally extending inwardly inclined bearing surfaces connected to each other at their inner ends at substantially an obtuse angle and providing at their outer ends inclined portions for contact with said one surface of said web.

8. The hook structure defined in claim 1, wherein the crossbar on said body portion has at opposite ends thereof longitudinally aligned longitudinally extending inwardly inclined bearing surfaces connected to each other at their inner ends at substantially an obtuse angle and providing at their outer ends inclined portions for contact with said one surface of said web, and the crossbar at the free end of said C-shaped portion is provided at opposite ends thereof with longitudinally aligned longitudinally extending inwardly inclined bearing surfaces connected to each other at their inner ends at substantially an obtuse angle and providing at their outer ends inclined portions for contact with the opposite surface of said web.

References Cited by the Examiner

UNITED STATES PATENTS

| | | | |
|---|---|---|---|
| 1,616,766 | 2/27 | Staples | 24—230.5 XR |
| 2,322,576 | 6/43 | Huebshman et al. | 24—230.5 |
| 2,351,176 | 6/44 | Wirkkala | 296—82 |
| 2,354,746 | 8/44 | Duzmal | 248—228 |
| 2,591,986 | 4/52 | Weiss et al. | 24—230.5 |
| 3,018,079 | 1/62 | Stough et al. | 248—119 |

CLAUDE A. LE ROY, *Primary Examiner.*